United States Patent
Estelle

Patent Number: 5,270,867
Date of Patent: Dec. 14, 1993

[54] COMPACT ZOOM LENS HAVING A WEAK FRONT LENS GROUP

[75] Inventor: Lee R. Estelle, Rochester, N.Y.

[73] Assignee: Eastman Kodak Company, Rochester, N.Y.

[21] Appl. No.: 807,541

[22] Filed: Dec. 13, 1991

[51] Int. Cl.$^5$ .............................................. G02B 15/14
[52] U.S. Cl. .................................. 359/692; 359/717; 359/795
[58] Field of Search .................... 359/717, 791–795, 359/676, 677, 680, 682, 681, 689

[56] References Cited

U.S. PATENT DOCUMENTS

| | | | |
|---|---|---|---|
| 4,720,179 | 1/1988 | Ito | 350/423 |
| 4,772,106 | 9/1988 | Ogata et al. | 359/692 |
| 4,787,718 | 11/1988 | Cho | 350/427 |
| 4,815,830 | 3/1989 | Sato et al. | 350/427 |
| 4,830,476 | 5/1989 | Aoki | 350/427 |
| 4,836,660 | 6/1989 | Ito | 350/423 |
| 4,854,683 | 8/1989 | Ozawa | 350/427 |
| 4,889,416 | 12/1989 | Yamada | 350/426 |
| 4,906,077 | 3/1990 | Ito | 359/692 |
| 4,911,539 | 3/1990 | Tsunashima et al. | 359/676 |
| 4,936,661 | 6/1990 | Betensky et al. | 350/423 |
| 4,953,957 | 9/1990 | Kobayashi | 350/423 |
| 4,984,877 | 1/1991 | Ito | 359/692 |
| 4,991,945 | 2/1991 | Estelle | 359/692 |
| 4,993,814 | 2/1991 | Hata | 350/426 |
| 5,000,549 | 3/1991 | Yamazaki | 359/676 |
| 5,153,777 | 10/1992 | Okada et al. | 359/716 |

FOREIGN PATENT DOCUMENTS 3-150518  6/1991  Japan .

*Primary Examiner*—Bruce Y. Arnold
*Assistant Examiner*—James Phan
*Attorney, Agent, or Firm*—Leonard W. Treash, Jr.

[57] ABSTRACT

A zoom lens having two units of lens components including from the object side a positive optical unit and a negative optical unit. The positive optical unit includes two lens subunits, a weak power subunit, and a positive power subunit, while the negative optical unit consists of a negative lens component and provides most of the magnification change during zooming.

11 Claims, 5 Drawing Sheets

COMPACT ZOOM LENS HAVING A WEAK FRONT LENS GROUP

BACKGROUND OF THE INVENTION

1. Related Application

This application is related to co-assigned U.S. patent application Ser. No. 07/807,521, filed Dec. 13, 1991, entitled ZOOM LENS SYSTEM FOR USE IN A COMPACT CAMERA, in the name of Lee R. Estelle.

2. Field of the Invention

This invention relates to compact zoom lenses. Although the invention has general application, it is particularly useable in still photographic cameras.

3. Background Art

U.S. Pat. No. 4,936,661 to E. T. Betensky et al, issued Jun. 26, 1990, described a zoom lens with a short back focal length and having, from front to rear, negative, positive and negative optical units. The negative unit closest to the image is movable during zooming to provide a majority of the change in focal length. In some of the examples, the front two units move as a single optical group during zooming, and in others they move relative to each other during zooming. These lenses have remarkable corrections and compactness for their aperture, zoom range and simplicity. The short back focal length makes them particularly useful as zoom objectives in "viewfinder" (non-SLR) cameras.

U.S. Pat. Nos. 4,836,660 and 4,720,179, issued Jun. 6, 1989 and Jan. 19, 1988, respectively, to Ito, show relatively complex zoom lenses also having a moving rear negative lens group. A front positive group is composed of a weak front negative optical unit which in turn is made up of several strong single element lens components.

U.S. Pat. No. 4,854,683, to Ozawa, issued Aug. 8, 1989 has a fixed positive component between a rear negative lens group and the image plane in a construction otherwise somewhat similar to the Ito lenses.

Other similar zoom lenses are shown in U.S. Pat. Nos. 4,953,957, to Kobayashi, issued Sep. 4, 1990; 4,889,416, to Yamada, issued Dec. 26, 1989; 4,993,814, to Hata, issued Feb. 19, 1991; 4,787,718, to Cho, issued Nov. 29, 1988; 4,830,476 to Aoki, issued May 16, 1989; and 4,818,081 to Ito, issued Apr. 4, 1989. These lenses are complex, have several correcting elements and as a consequence are limited in both aperture and focal length range.

SUMMARY OF THE INVENTION

Most of the above lenses include a positive second subunit which moves during zooming, which positive unit contains the primary lens aperture stop. This results in an effective aperture at this positive unit which becomes proportionally larger as the focal length is increased unless the relative aperture of the entire lens is allowed to decrease substantially with the increase in focal length. If the focal length range is extended beyond 2 to 1, the problem is more severe, and correcting the aberrations for the larger aperture is not generally consistent with the desirability of compactness, low cost and general simplicity of design.

According to the invention, these problems are solved by a zoom lens having two optical units of lens components. It includes from the object side, a first positive optical unit and a second negative optical unit. The zoom lens achieves zooming between a wide angle position and a narrow angle position by changing the distance between the first and second optical units. The first optical unit includes two optical subunits, a first, weak subunit having no strong lens component and positioned on the object side of the first optical unit and a second positive subunit following the first subunit. The second negative optical unit provides most of the magnification change during zooming and consists of a single negative lens component. The zoom lens satisfies the following condition:

$$.17 < \left| \frac{K_{1A}}{K_w} \right| < 0.9$$

where $K_{1A}$ is the power of the first subunit and $K_w$ is the power of the zoom lens at its wide angle position.

According to preferred embodiments, the ratio $|K_{1A}/K_w|$ is equal to or greater than 0.4. According to some embodiments it is slightly negative and some it is slightly positive.

For lowest cost and greatest simplicity, the preferred embodiment of the first unit is a single element. In some of the embodiments, this element has at least one aspheric surface. The weak front optical subunit serves as an aberration corrector, but because of the weak power the aperture size of the second subunit can be small. The front element is typically negative. The negative front element is used to control the back focus of the zoom lens in the wide angle position. The aperture stop is positioned in front of the second subunit, e.g., close to the first optical unit. The aberration correcting ability of a separated first subunit is retained. Placing the aperture stop forward of the second subunit rather than behind it allows the second subunit to participate more fully in the correction of all aberations and assures a small front window. At the same time, the aperture stop can be placed close to the first optical subunit which minimizes the front unit's lens elements diameters and reduces or eliminates variation of entrance pupil position during zooming.

With this invention, well corrected zoom lenses are obtained with apertures varying from f/8 to f/11 across a zoom range of about 2 to 1 using as few as three or four lens elements.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
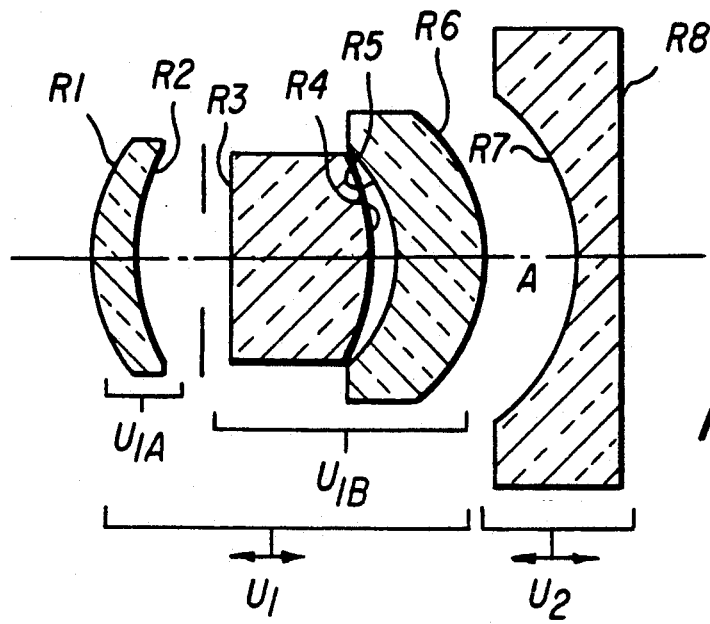
FIGS. 1–10 are simplified schematic cross-sectional views of a zoom lens constructed according to ten embodiments of the present invention.
Figure 2:
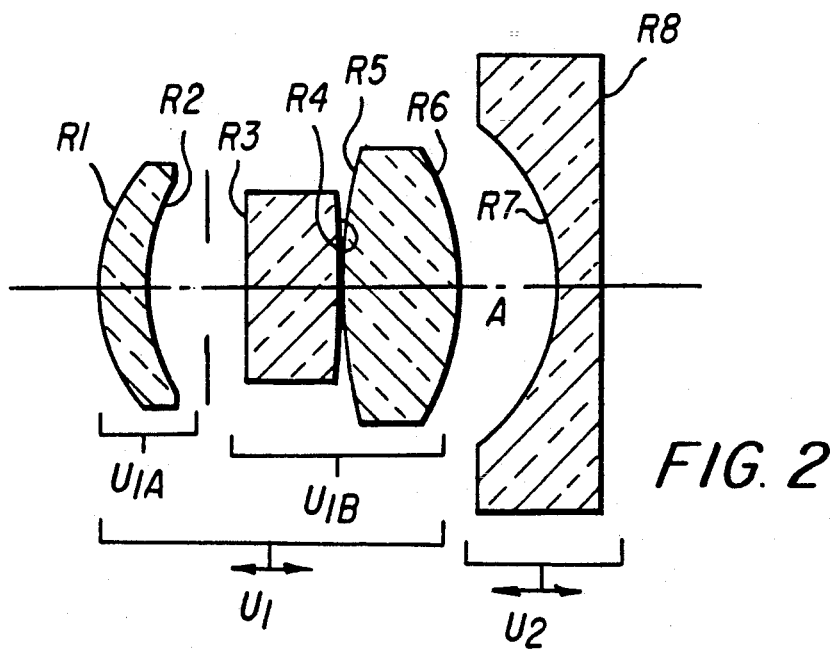
Figure 3:
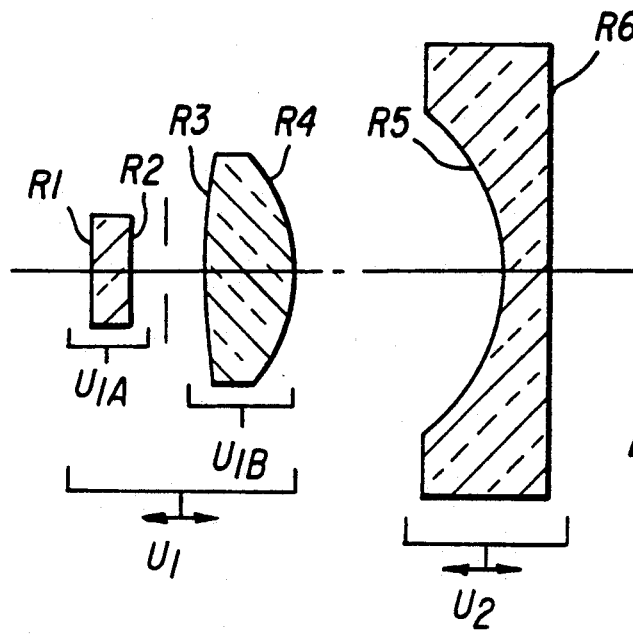
Figure 4:
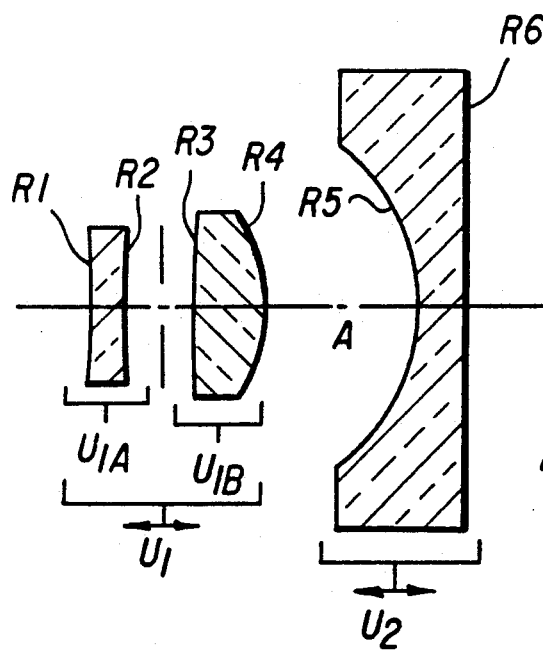
Figure 5:
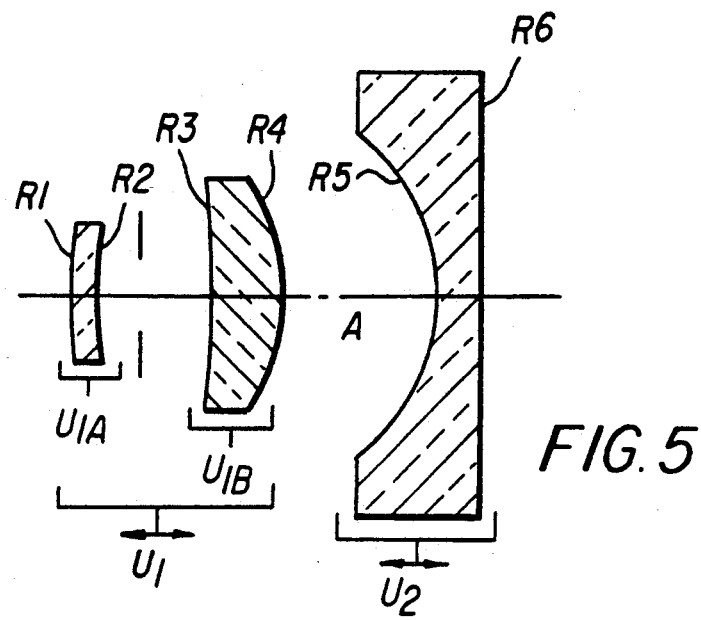
Figure 6:
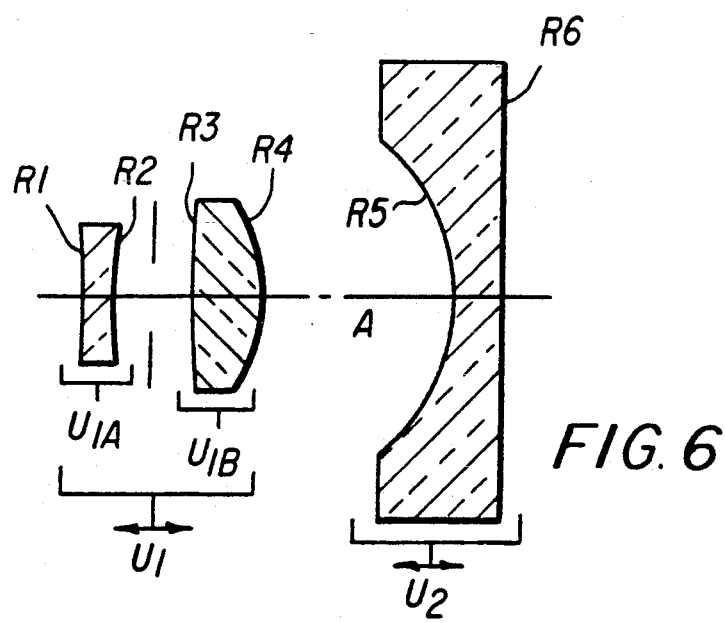
Figure 7:
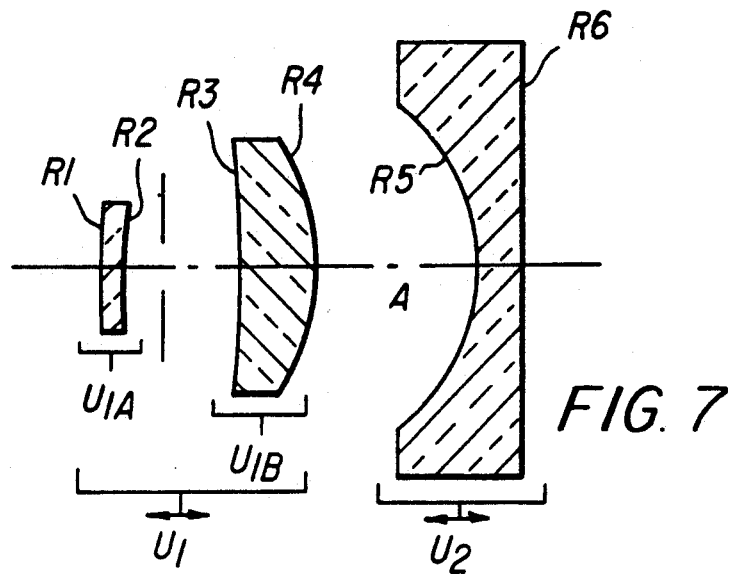
Figure 8:
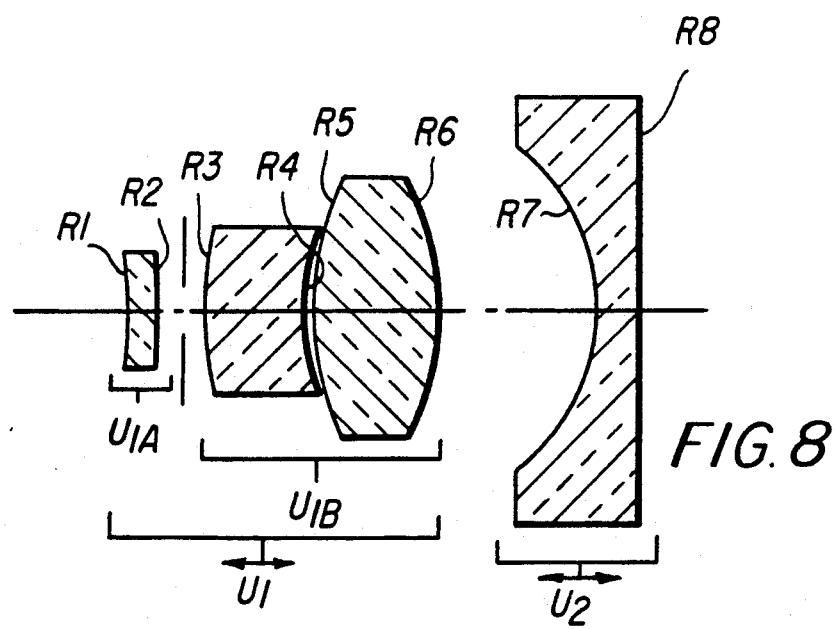
Figure 9:
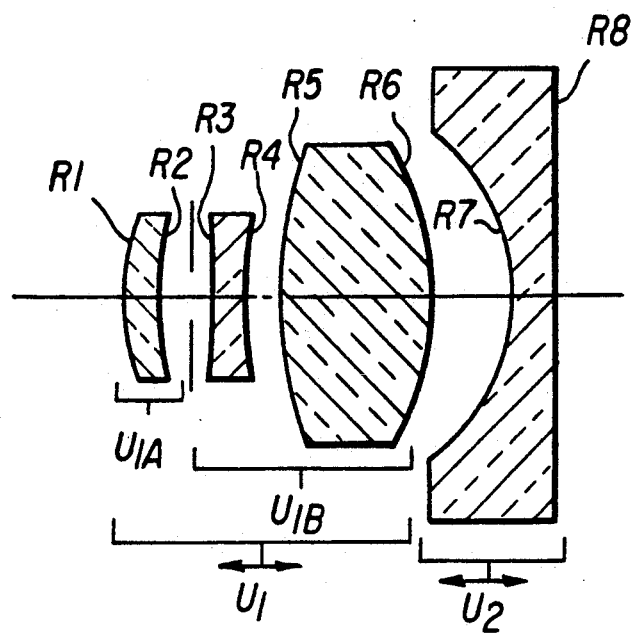
Figure 10:
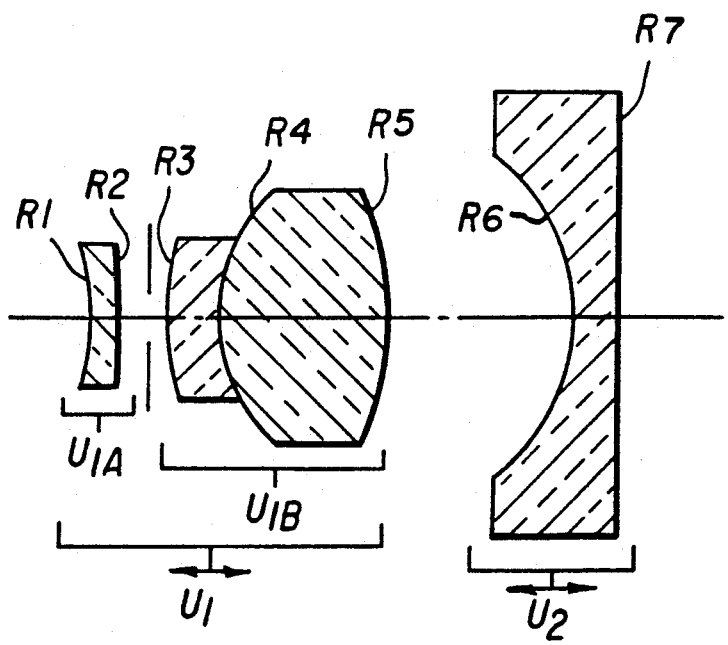

The embodiments of the invention are shown in FIGS. 1–10 and are illustrated by a series of examples set forth in Tables 1–10. In the drawings the surfaces R are numbered by subscripts from the front or object side of the lens to the rear or image side of the lens. The thickness of the lens elements T and the spacings S including the zooming space A between elements are also numbered from front to rear. In the tables, surfaces and thicknesses are listed on the same line as the surface preceding the thickness or spacing as the case may be. All indexes $N_e$ are for the green mercury e line of the spectrum at a wavelength $\lambda_e$ of 5461 Å. V is the Abbe number of the lens elements.

All of the examples contain two optical units, specified as $U_1$ and $U_2$ in the drawings. Subunits $U_{1A}$ and $U_{1B}$ make up the first optical unit $U_1$ and $U_2$ is the second group. In the embodiments shown in FIGS. 1 through 10, optical subunits $U_{1A}$ and $U_{1B}$ move together during zooming, and the space between these two optical subunits does not vary for zooming. These embodiments thus have the substantial advantage of requiring a much simpler zooming mechanism than would be required otherwise. However, in the broader aspects of the invention, it is contemplated that the air space between the optical subunits $U_{1A}$ and $U_{1B}$ may be made to vary during zooming.

Optical subunit $U_{1A}$ in each example is a single weak lens component which may or may not have aspheric surfaces. By "weak," it is meant that the power of a first subunit $U_{1A}$ is smaller than the power of the first optical unit $U_1$ so that the absolute value of the ratio of power, $K_{1A}$, of the optical subunit $U_{1A}$ to the power, $K_1$, of the optical unit $U_1$ is about 0.5 or less or $$\left|\frac{K_{1A}}{K_1}\right| < 0.5.$$

In Examples 3 through 10, this subunit $U_{1A}$ is negative in power. In Examples 1 and 2, it is slightly positive in power. In all examples, its power is less than 0.9 times that of the power of the entire lens at its wide angle position. However, its power is preferably between 0.4 and 0.9 times the power of the entire lens as is the case with the Examples 1 through 6, 9 and 10.

The second lens subunit, $U_{1B}$, is positive in all examples. It contains one or more lens elements. In Examples 1, 2, 8 and 9, it contains two very slightly air-spaced elements. In example 10, it is a cemented doublet. In examples 3 through 7, it is a single lens element.

The aperture stop is positioned between the first and second subunits. It facilitates correction of the lens especially at its telephoto position, as well as minimizing the aperture size of the second optical unit. This permits a numerical aperture f/11 at the long focal length position, while maintaining an aperture of at least f/8 at the short focal length position in a zoom lens having a range of 2.

The second optical unit $U_2$ is substantially negative in power. Its movement provides most of the change in focal length of the lens during zooming and consists of a single negative lens component.

Note that all of the examples are corrected across a zoom range of 2 with an effective aperture that varies from approximately f/8 to f/11. This range of apertures for a 3 or 4 element zoom lens suitable as an objective or taking lens for a 35 mm camera is quite remarkable.

TABLE 1

EXAMPLE 1

| SURFACE | CLEAR APER. | RADIUS | THICKNESS | MATERIAL |
|---|---|---|---|---|
| R1 | 10.12 | 8.80 | 2.00 | 589613 |
| R2 | 8.32 | 11.51 | 3.34 | |
| | 3.75 | DIAPHRAGM | 1.00 | |
| R3 | 4.22 | −66.23 | 6.25 | 772497 |
| R4 | 9.01 | −9.40 | 0.79 | |
| R5 | 9.11 | −6.60 | 4.03 | 834372 |
| R6 | 12.87 | −8.67 | A | |
| R7 | 17.05 | −12.22 | 1.50 | 702412 |

TABLE 1-continued

EXAMPLE 1

| | | | | |
|---|---|---|---|---|
| R8 | 22.01 | −115.78 | | |

| SURFACES | EF | BF | FF |
|---|---|---|---|
| R1–R6 | 17.46 | 13.41 | 4.97 |
| R7–R8 | −19.48 | −20.47 | −19.38 |

$$\left|\frac{K_{1A}}{K_w}\right| = .53 \text{ and } \left|\frac{K_{1A}}{K_1}\right| = .35$$

| EF | A | REL. APER. |
|---|---|---|
| 49.51 | 0.91 | 11.24 |
| 34.65 | 3.85 | 9.40 |
| 26.08 | 7.08 | 8.20 |

TABLE 2

EXAMPLE 2

| SURFACE | CLEAR APER. | RADIUS | THICKNESS | MATERIAL |
|---|---|---|---|---|
| R1 | 10.00 | 11.08 | 2.00 | 589613 |
| R2 | 8.13 | 15.79 | 3.24 | |
| | 3.88 | DIAPHRAGM | 1.00 | |
| R3 | 4.00 | −19.21 | 4.03 | 762266 |
| R4 | 8.17 | −59.17 | 0.30 | |
| R5 | 9.89 | 39.79 | 5.08 | 772497 |
| R6 | 12.28 | −12.46 | A | |
| R7 | 14.61 | −9.64 | 1.50 | 772497 |
| R8 | 19.18 | −50.43 | | |

| SURFACES | EF | BF | FF |
|---|---|---|---|
| R1–R6 | 15.05 | 12.85 | 3.84 |
| R7–R8 | −15.61 | −16.67 | −15.41 |

$$\left|\frac{K_{1A}}{K_w}\right| = .48 \text{ and } \left|\frac{K_{1A}}{K_1}\right| = .28$$

| EF | A | REL. APER. |
|---|---|---|
| 49.79 | 2.17 | 11.24 |
| 34.65 | 4.23 | 9.40 |
| 26.03 | 6.48 | 8.20 |

TABLE 3

EXAMPLE 3

| SURFACE | CLEAR APER. | RADIUS | THICKNESS | MATERIAL |
|---|---|---|---|---|
| R1 | 4.45 | ASPHERE | 1.40 | 535405 |
| R2 | 4.41 | 10.75 | 0.30 | |
| | 4.42 | DIAPHRAGM | 2.79 | |
| R3 | 8.22 | 42.95 | 3.60 | 492574 |
| R4 | 9.50 | ASPHERE | A | |
| R5 | 15.42 | ASPHERE | 2.00 | 535405 |
| R6 | 21.55 | −690.15 | | |

ASPHERIC EQUATION:

$$X = \frac{CY^2}{1 + \sqrt{1 - (k+1)C^2Y^2}} +$$

$$DY^4 + EY^6 + FY^8 + GY^{10} + HY^{12} + IY^{14}$$

| SURFACE R1 | C = 0.033<br>k = 0.000 | D = −0.751E − 03<br>E = 0.606E − 04<br>F = 0.121E − 04<br>G = −0.135E − 04 | H = 0.322E − 05<br>I = −0.260E − 06 |
|---|---|---|---|
| SURFACE R4 | C = −0.143<br>k = −0.999 | D = −0.311E − 03<br>E = −0.172E − 05<br>F = −0.813E − 06<br>G = 0.848E − 07 | H = −0.373E − 08<br>I = 0.582E − 10 |
| SURFACE R5 | C = −0.098<br>k = −0.810 | D = −0.456E − 04<br>E = −0.474E − 05<br>F = 0.242E − 06<br>G = −0.765E − 08 | H = 0.113E − 09<br>I = −0.655E − 12 |

TABLE 3-continued

EXAMPLE 3

$$\left|\frac{K_{1A}}{K_w}\right| = .819 \text{ and } \left|\frac{K_{1A}}{K_1}\right| = .52$$

| EF | A | REL. APER. |
|---|---|---|
| 50.07 | 5.75 | 11.24 |
| 34.61 | 8.57 | 9.40 |
| 25.92 | 11.63 | 8.20 |

TABLE 4

EXAMPLE 4

| SURFACE | CLEAR APER. | RADIUS | THICKNESS | MATERIAL |
|---|---|---|---|---|
| R1 | 6.12 | −31.13 | 1.40 | 590309 |
| R2 | 4.90 | ASPHERE | 1.30 | |
|  | 4.72 | DIAPHRAGM | 1.98 | |
| R3 | 6.44 | 46.89 | 3.60 | 492574 |
| R4 | 8.45 | ASPHERE | A | |
| R5 | 17.17 | ASPHERE | 2.00 | 535405 |
| R6 | 23.99 | −700.15 | | |

ASPHERIC EQUATION:

$$X = \frac{CY^2}{1 + \sqrt{1 - (k+1)C^2Y^2}} + DY^4 + EY^6 + FY^8 + GY^{10} + HY^{12} + IY^{14}$$

| | | | |
|---|---|---|---|
| SURFACE R2 | C = 0.015<br>k = 0.0 | D = 0.477E − 03<br>E = 0.176E − 05<br>F = −0.426E − 05<br>G = 0.784E − 06 | H = −0.206E − 07<br>I = 0.0 |
| SURFACE R4 | C = −0.125<br>k = −1.126 | D = −0.161E − 03<br>E = −0.362E − 04<br>F = 0.611E − 05<br>G = −0.564E − 06 | H = 0.259E − 07<br>I = −0.465E − 09 |
| SURFACE R5 | C = −0.086<br>k = −0.653 | D = −0.484E − 04<br>E = −0.157E − 05<br>F = 0.542E − 07<br>G = −0.143E − 08 | H = 0.187E − 10<br>I = −0.957E − 13 |

$$\left|\frac{K_{1A}}{K_w}\right| = .74 \text{ and } \left|\frac{K_{1A}}{K_1}\right| = .47$$

| EF | A | REL. APER. |
|---|---|---|
| 50.01 | 7.35 | 11.24 |
| 34.65 | 10.97 | 9.40 |
| 26.06 | 14.85 | 8.20 |

TABLE 5

EXAMPLE 5

| SURFACE | CLEAR APER. | RADIUS | THICKNESS | MATERIAL |
|---|---|---|---|---|
| R1 | 5.90 | 25.05 | 1.00 | 590309 |
| R2 | 4.90 | ASPHERE | 1.30 | |
|  | 4.40 | DIAPHRAGM | 3.76 | |
| R3 | 8.18 | −58.15 | 3.00 | 713538 |
| R4 | 9.78 | −9.40 | A | |
| R5 | 15.42 | ASPHERE | 2.00 | 535405 |
| R6 | 21.20 | −433.42 | | |

ASPHERIC EQUATION:

$$X = \frac{CY^2}{1 + \sqrt{1 - (k+1)C^2Y^2}} + DY^4 + EY^6 + FY^8 + GY^{10} + HY^{12} + IY^{14}$$

| | | | |
|---|---|---|---|
| SURFACE R2 | C = 0.052<br>k = 0.0 | D = 0.360E − 03<br>E = 0.349E − 04<br>F = −0.267E − 04<br>G = 0.604E − 05 | H = −0.450E − 06<br>I = 0.0 |

TABLE 5-continued

EXAMPLE 5

| | | | |
|---|---|---|---|
| SURFACE R5 | C = −0.096<br>k = −0.607 | D = −0.522E − 04<br>E = −0.190E − 05<br>F = 0.920E − 07<br>G = −0.281E − 08 | H = 0.415E − 10<br>I = −0.238E − 12 |

| SURFACES | EF | BF | FF |
|---|---|---|---|
| R1-R4 | 16.43 | 17.31 | 8.29 |
| R5-R6 | −19.85 | −21.19 | −19.82 |

$$\left|\frac{K_{1A}}{K_w}\right| = .178 \text{ and } \left|\frac{K_{1A}}{K_1}\right| = .11$$

| EF | A | REL. APER. |
|---|---|---|
| 49.59 | 4.07 | 11.24 |
| 34.65 | 6.90 | 9.40 |
| 26.06 | 10.00 | 8.20 |

TABLE 6

EXAMPLE 6

| SURFACE | CLEAR APER. | RADIUS | THICKNESS | MATERIAL |
|---|---|---|---|---|
| R1 | 6.12 | −173.69 | 1.40 | 590309 |
| R2 | 4.90 | ASPHERE | 1.30 | |
|  | 4.62 | DIAPHRAGM | 2.12 | |
| R3 | 6.70 | 60.11 | 3.60 | 492574 |
| R4 | 8.59 | ASPHERE | A | |
| R5 | 15.56 | ASPHERE | 2.00 | 535405 |
| R6 | 21.57 | 1,334.15 | | |

ASPHERIC EQUATION:

$$X = \frac{CY^2}{1 + \sqrt{1 - (k+1)C^2Y^2}} + DY^4 + EY^6 + FY^8 + GY^{10} + HY^{12} + IY^{14}$$

| | | | |
|---|---|---|---|
| SURFACE R2 | C = 0.043<br>k = 0.0 | D = 0.654E − 03<br>E = −0.878E − 04<br>F = 0.447E − 04<br>G = −0.843E − 05 | H = 0.574E − 06<br>I = 0.0 |
| SURFACE R4 | C = −0.140<br>k = −0.989 | D = −0.104E − 03<br>E = −0.691E − 04<br>F = 0.116E − 04<br>G = −0.105E − 05 | H = 0.468E − 07<br>I = −0.806E − 09 |
| SURFACE R5 | C = −0.094<br>k = −0.705 | D = −0.297E − 04<br>E = −0.343E − 05<br>F = 0.125E − 06<br>G = −0.307E − 08 | H = 0.398E − 10<br>I = −0.222E − 12 |

| SURFACES | EF | BF | FF |
|---|---|---|---|
| R1-R4 | 16.83 | 19.39 | 8.75 |
| R5-R6 | −19.48 | −20.77 | −19.49 |

$$\left|\frac{K_{1A}}{K_w}\right| = .76 \text{ and } \left|\frac{K_{1A}}{K_1}\right| = .49$$

| EF | A | REL. APER. |
|---|---|---|
| 49.61 | 6.51 | 11.24 |
| 34.63 | 9.37 | 9.40 |
| 26.05 | 12.49 | 8.20 |

TABLE 7

EXAMPLE 7

| SURFACE | CLEAR APER. | RADIUS | THICKNESS | MATERIAL |
|---|---|---|---|---|
| R1 | 5.85 | 23.60 | 1.00 | 689312 |
| R2 | 4.90 | ASPHERE | 1.30 | |
|  | 4.41 | DIAPHRAGM | 3.68 | |
| R3 | 8.34 | −57.10 | 3.00 | 713538 |
| R4 | 9.76 | −9.32 | A | |
| R5 | 15.60 | ASPHERE | 2.00 | 575415 |
| R6 | 21.20 | −203.40 | | |

TABLE 7-continued
EXAMPLE 7

ASPHERIC EQUATION:

$$X = \frac{CY^2}{1 + \sqrt{1 - (k+1)C^2Y^2}} + DY^4 + EY^6 + FY^8 + GY^{10} + HY^{12} + IY^{14}$$

| SURFACE R2 | C = 0.054<br>k = 0.0 | D = 0.351E − 03<br>E = 0.193E − 04<br>F = −0.215E − 04<br>G = 0.532E − 05 | H = −0.417E − 06<br>I = 0.000E + 00 |
|---|---|---|---|
| SURFACE R5 | C = −0.094<br>k = −0.577 | D = −0.501E − 04<br>E = −0.130E − 05<br>F = 0.658E − 07<br>G = −0.209E − 08 | H = 0.315E − 10<br>I = −0.181E − 12 |

| SURFACES | EF | BF | FF |
|---|---|---|---|
| R1–R4 | 16.43 | 17.31 | 8.29 |
| R5–R6 | −19.85 | −21.19 | −19.82 |

$$\left|\frac{K_{1A}}{K_w}\right| = .20$$

| EF | A | REL. APER. |
|---|---|---|
| 49.79 | 4.38 | 11.24 |
| 34.65 | 7.21 | 9.40 |
| 26.06 | 10.28 | 8.20 |

TABLE 8
EXAMPLE 8

| SURFACE | CLEAR APER. | RADIUS | THICKNESS | MATERIAL |
|---|---|---|---|---|
| R1 | 5.54 | −13.45 | 1.23 | 722293 |
| R2 | 5.25 | −19.27 | 1.00 | |
| | 4.68 | DIAPHRAGM | 1.01 | |
| R3 | 4.89 | 17.25 | 4.29 | 762270 |
| R4 | 7.50 | 13.18 | 0.37 | |
| R5 | 8.49 | 17.12 | 5.91 | 623581 |
| R6 | 11.50 | −12.86 | A | |
| R7 | 16.00 | −10.27 | 1.50 | 517642 |
| R8 | 22.16 | 356.34 | | |

| SURFACES | EF | BF | FF |
|---|---|---|---|
| R1–R6 | 17.24 | 16.49 | 9.05 |
| R7–R8 | −19.23 | −20.18 | −19.25 |

$$\left|\frac{K_{1A}}{K_w}\right| = .39 \text{ and } \left|\frac{K_{1A}}{K_1}\right| = .26$$

| EF | A | REL. APER. |
|---|---|---|
| 49.73 | 3.90 | 11.24 |
| 34.64 | 6.80 | 9.40 |
| 26.01 | 9.98 | 8.20 |

TABLE 9
EXAMPLE 9

| SURFACE | CLEAR APER. | RADIUS | THICKNESS | MATERIAL |
|---|---|---|---|---|
| R1 | 6.00 | 10.73 | 1.50 | 589613 |
| R2 | 5.03 | 16.62 | 1.36 | |
| | 4.04 | DIAPHRAGM | 0.93 | |
| R3 | 3.96 | −68.99 | 1.73 | 548458 |
| R4 | 5.93 | 19.86 | 1.14 | |
| R5 | 9.47 | 31.71 | 7.00 | 772497 |
| R6 | 13.17 | −12.07 | A | |
| R7 | 14.99 | −9.91 | 2.48 | 575415 |
| R8 | 21.01 | 1,000.00 | | |

| SURFACES | EF | BF | FF |
|---|---|---|---|
| R1–R5 | 15.10 | 12.82 | 6.07 |
| R6–R7 | −16.95 | −18.51 | −29.29 |

TABLE 9-continued
EXAMPLE 9

$$\left|\frac{K_{1A}}{K_w}\right| = .56 \text{ and } \left|\frac{K_{1A}}{K_1}\right| = .32$$

| EF | A | REL. APER. |
|---|---|---|
| 49.18 | 1.06 | 11.24 |
| 34.64 | 3.25 | 9.40 |
| 26.06 | 5.68 | 8.20 |

TABLE 10
EXAMPLE 10

| SURFACE | CLEAR APER. | RADIUS | THICKNESS | MATERIAL |
|---|---|---|---|---|
| R1 | 5.50 | −13.61 | 1.09 | 613586 |
| R2 | 5.20 | −27.11 | 1.00 | |
| | 4.69 | DIAPHRAGM | 1.01 | |
| R3 | 5.88 | 17.08 | 2.14 | 805254 |
| R4 | 6.75 | 7.54 | 8.00 | 652449 |
| R5 | 11.13 | −13.14 | A | |
| R6 | 16.16 | −10.25 | 1.50 | 517642 |
| R7 | 22.63 | 298.46 | | |

| SURFACES | EF | BF | FF |
|---|---|---|---|
| R1–R5 | 17.33 | 17.38 | −9.12 |
| R6–R7 | −19.08 | −20.03 | −19.11 |

$$\left|\frac{K_{1A}}{K_w}\right| = .57 \text{ and } \left|\frac{K_{1A}}{K_1}\right| = .38$$

| EF | A | REL. APER. |
|---|---|---|
| 49.85 | 4.90 | 11.24 |
| 34.64 | 7.82 | 9.55 |
| 25.99 | 10.99 | 8.20 |

The invention has been described in detail with particular reference to a preferred embodiment thereof, but it will be understood that variations and modifications can be effected within the spirit and scope of the invention as described hereinabove and as defined in the appended claims. For example, the single element front lens forming subunit $U_{1A}$ could be divided into two or more very weak components. Similarly, one or more components of the first unit could be made into a doublet. Although, such minor changes are within the scope of the invention, they would detract from its simplicity. Thus, a single element first unit is preferred.

What is claimed is:

1. A zoom lens comprising two optical units of lens components including, from the object side, a first positive optical unit and a second negative optical unit and which zoom lens achieves zooming between a wide angle position and a narrow angle position by changing a distance between the first and the second optical units;
said first optical unit including two optical subunits separated by an aperture stop, a first, weak single component, negative subunit positioned on the object side of said first optical unit and a second positive subunit consisting of a positive doublet;
said second optical unit having negative power, said second optical unit consisting of a single negative lens component; and
said zoom lens satisfying the following condition $$.17 < \left|\frac{K_{1A}}{K_w}\right| < 0.9$$

where $K_{1A}$ is the power of the first subunit and $K_w$ is the power of the zoom lens at its wide angle position.

2. A zoom lens according to claim 1, wherein said lens component of said second optical unit is a single lens element.

3. A zoom lens according to claim 1 wherein the first unit has at least one aspheric surface.

4. A zoom lens according to claim 1 wherein the ratio of $|K_{1A}/K_w|$ is greater than 0.4.

5. A zoom lens according to claim 1 wherein said first optical subunit is a single element having at least one aspheric surface.

6. A zoom lens according to claim 5 wherein $K_{1A}$ is negative.

7. A zoom lens comprising two optical units of lens components including, from the object side, a first positive optical unit and a second negative optical unit and which zoom lens achieves zooming between a wide angle position and a narrow angle position by changing the distance between the first and the second optical units;

said first optical unit including two optical subunits separated by an aperture stop, a first weak, single component, negative subunit positioned on the object side of said first optical unit, and a second positive subunit;

said second optical unit consisting of a single negative lens component; and said zoom lens satisfying the following condition $$\left|\frac{K_{1A}}{K_1}\right| < 0.5$$

where $K_{1A}$ is the optical power of the first subunit and $K_1$ is the power of the first unit.

8. A zoom lens according to claim 7 wherein the second subunit consists of a singlet.

9. A zoom lens according to claim 7 wherein the second subunit consists of a doublet.

10. A zoom lens according to claim 7 wherein the first unit has at least one aspheric surface.

11. A zoom lens according to claim 7 wherein said first optical subunit is a single element having at least one aspheric surface.

* * * * *